United States Patent [19]

McKelley, Jr. et al.

[11] Patent Number: 4,480,314
[45] Date of Patent: Oct. 30, 1984

[54] METHOD FOR OPTIMIZING PRINTER RESPONSE TIME FOR A KEY TO PRINT OPERATION

[75] Inventors: Charles R. McKelley, Jr., Round Rock; Leslie A. Minshall; Peter J. Pirich, Jr., both of Austin, all of Tex.

[73] Assignee: International Business Machines Corporation, Armonk, N.Y.

[21] Appl. No.: 379,274

[22] Filed: May 17, 1982

[51] Int. Cl.³ .............................................. G06F 3/12
[52] U.S. Cl. ................................................. 364/900
[58] Field of Search ........................ 364/900 MS File

[56] References Cited
U.S. PATENT DOCUMENTS 4,416,558 11/1983 McInroy et al. ............... 364/900 X Primary Examiner—Raulfe B. Zache
Attorney, Agent, or Firm—Harold E. Meier

[57] ABSTRACT

A method for optimizing the printer operation in a word processing system when the data rate varies from character to character. A circular buffering scheme accepts blocks of data from an application task of a word processor as it is keyed. Data is stored in the circular buffer pool, and a background print task asynchronously removes data from the pool and reblocks it before sending the data to the printer. Data from one or more application blocks is reblocked in FIFO order until the optimum number of commands is reached or all application data is processed. All parameters are table-driven, so that the method of optimizing the printer operation is expandable as new types of printers are added to the word processing system.

10 Claims, 5 Drawing Figures

METHOD FOR OPTIMIZING PRINTER RESPONSE TIME FOR A KEY TO PRINT OPERATION

DESCRIPTION

BACKGROUND OF THE INVENTION

1. Field of the Invention

This invention relates to a method for reducing printer response time in a word processing system having a variable keyboard data rate. In particular, the invention pertains to a buffering scheme suitable for a variety of printers associated with a word processing system to improve the response time of the printers from keyboard commands controlling the printer.

2. Description of Prior Art

Word processing systems have been developed to enable an operator to create an output or printed copy of a document. As the operator types the document, the characters and commands entered from the keyboard are visually displayed and are written onto a diskette. Upon completion of the keying of the document, the systems enable the operator to select a print task for reading the document off the diskette a line at a time and having each line translated into printer commands for outputting a hard copy of the document.

Improved word processing systems have been developed with expanded capabilities to enable the operator to produce a hard copy on a printer one character at a time in direct response to keyboard entries. The IBM Displaywriter word processing system's Key to Print feature provides the operator with such a capability. The Key to Print feature enables the operator to use the word processing keyboard controlled printer for typewriter-like typing tasks, such as filling in printed forms, without going through the intermediate step of displaying the completed typing task on the display and writing it onto the diskette. In the direct keyboard to printer typing environment, data from the keyboard is variable and irregular, and the several types of printers associated with word processing systems are designed for optimum operation as line printers. One printer works best, one logical command at a time, but other printers may work best in receiving multiple logical commands at one time, e.g., eight or ten commands. The varying input data rate in the keyboard to printer typing environment means that there is less than an optimum response time from the printer. A need has thus arisen for a method to minimize the observed delay time from operator key-stroke to printer completion to keep the printer operating at optimum speed when receiving variable sized input records.

SUMMARY OF THE INVENTION

The method of the present invention utilizes a buffering scheme for minimizing the printer response time from variable rate keyboard data. The buffering scheme accepts blocks of data from the application as soon as it is received from the operator's keying. The keyed input data is stored in a large circular pool buffer. The various sized blocks of data received from the keyboard are moved from the buffer pool and reblocked before forwarding to the printer. The new block of data is sized in accordance with the number of printer logical commands, rather the number of bytes transmitted, with the optimal number of logical commands varying with the printer type associated with the word processing system. The data from one or more of the application blocks placed in the buffer pool is reblocked in FIFO order until the optimum number of commands is reached or all application data is processed.

The buffering scheme initially interrogates the printer associated with the word processor to see if it is being shared or can be exclusively commanded by the operator's keyboard. The type of printer associated with the word processor is initially determined to select the optimal number of commands. Since all parameters of the buffering scheme are table driven, the method does not require the application to be knowledgeable of the characteristics of the printer and the method may be expanded to accommodate new types of printers added to the word processing system.

BRIEF DESCRIPTION OF THE DRAWINGS

For a more complete understanding of the present invention and further objects and advantages thereof, reference is now made to the following Detailed Description taken in conjunction with the following Drawings in which.

DESCRIPTION OF THE PREFERRED EMBODIMENT

Figure 1:
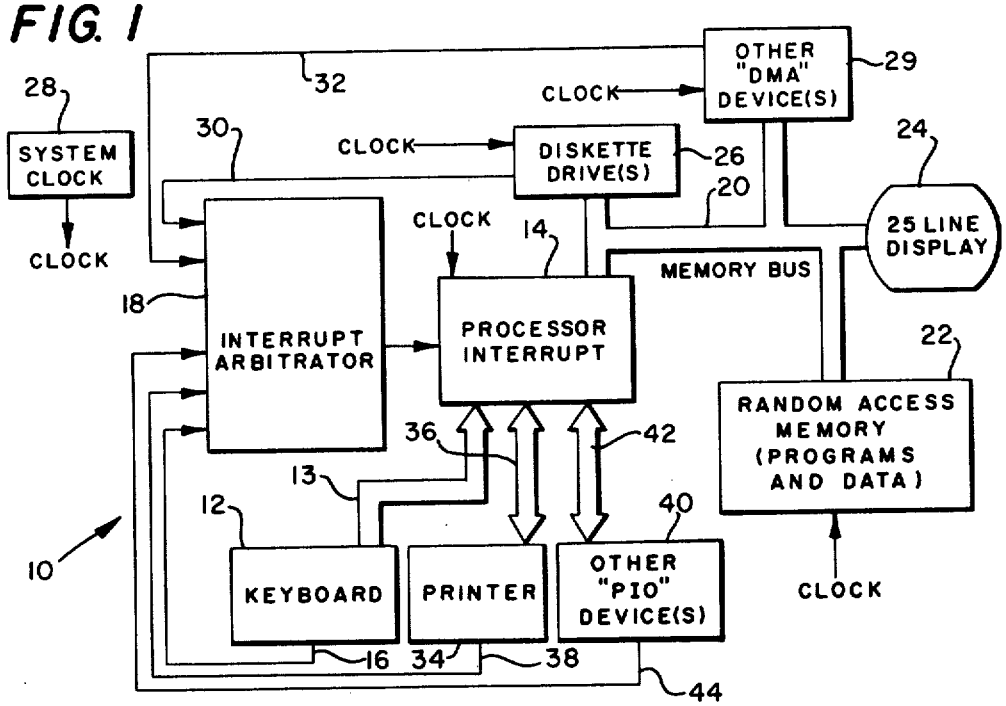
FIG. 1 is a block diagram of a word processing system utilizing the present invention.

Referring to FIG. 1, a block diagram of a word processing system 10 implementing the present invention is illustrated. A keyboard 12 is provided for inputting graphic characters, data and instructions to the word processing system 10. Graphic characters, data and instructions from the keyboard 12 are applied through a data bus 13 to an electronic digital signal processor 14 of the system. The processor 14 may be implemented by a commercially available microprocessor, such as the Intel Corporation 8086 processor. The Intel 8086 processor executes on one level with one set of registers. The keyboard 12 also provides a hardware interrupt signal by interrupt line 16 to an interrupt arbitrator 18. The 8259-A Interrupt Controller was selected to implement the interrupt arbitrator 18 to resolve interrupt request from the incoming interrupt lines. The 8259-A Interrupt Controller may resolve interrupt request from up to eight interrupt lines and up to eight priority levels for the 8086 processor 14.

The processor 14 performs the various control functions necessary for the word processing system 10 to process, edit and display data. The processor 14 is connected by a memory bus 20 to a random access memory 22 for storing system data programs. A visual display 24 is also connected by the memory bus 20 to the processor 14 for displaying data and information for enabling communication between a system and an operator of the system. A diskette drive 26 driven by the system clock 28 is also connected through the memory bus 20 to the processor 14. The diskette drive 26 comprises means for accessing the system programs loaded from the program library onto diskettes. Modules from the program library may be loaded or deleted from the diskettes. A word processing system 10 may include other direct memory access ("DMA") devices 29 connected by the memory bus 20 to the processor 14. The diskette drives and other "DMA" devices 29 provide hardware interrupt signals on interrupt lines 30 and 32, respectively, to the interrupt arbitrator 18.

A printer 34 communicates by an output data bus 36 with the processor 14 for providing a printed record of keyboard entered data or instructions from the system. The printer 34 provides another hardware interrupt signal by interrupt signal line 38 to the interrupt arbitrator 18. Other processor input/output devices 40 may also be provided as part of the system 10. The processor input/output devices 40 may communicate via an output data bus 42 to the processor 14 and provide hardware interrupt signal by interrupt signal line 44 to the interrupt arbitrator 18.

Figure 2:
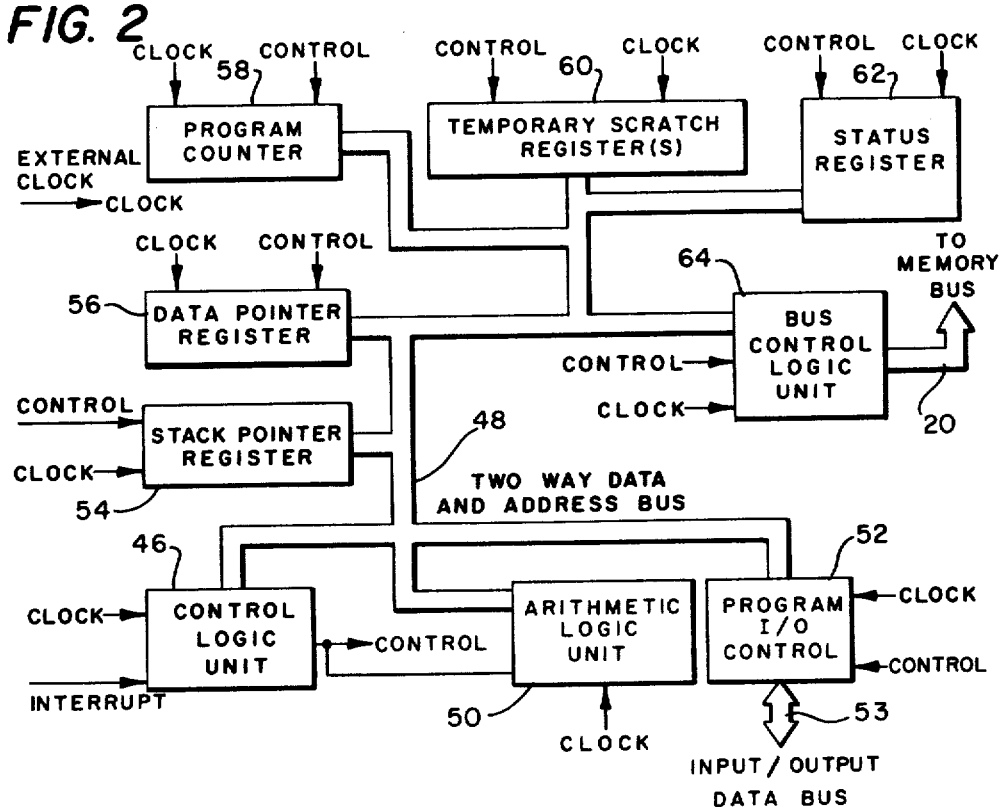
FIG. 2 is a block diagram of the processor illustrated in FIG. 1.

Referring now to FIG. 2, the processor 14 is illustrated in further detail to show the typical hardware elements found in such processors. The processor 14 includes a control logic unit 46 which receives priority interrupt signals from the interrupt arbitrator 18 of FIG. 1. The control logic unit 46 communicates via a two-way data and address bus 48 to the arithmetic logic unit 50, program I/O control 52, stack point register 54, data point register 56, program counter 58, temporary scratch register 60, status register 62, and bus control logic unit 46.

In response to a fetch instruction from the random access memory 22, the control logic unit 46 generates the control signals to the other logic units of the processor, including the arithmetic logic unit 50, the program I/O control 52, the program counter 58, temporary scratch register 60 and bus control logic unit 46. Data processed in the processor 14 is input through the bus control logic unit 46 and connected to the memory bus 20. Program I/O control unit 52 is connected to the input/output data bus 53. The bus control logic unit 46 connected to the memory bus 20 receives instructions for processing data to the input/output control 52. Synchronous operation of the control unit 46 with other logic elements of the processor 14 is achieved by means of clock pulses input to the processor 14 from an external clock source. Different storage sections of the random access memory 22 are identifiable for instruction storage and data storage.

Processed data from the processor 14 is output through the program input/output control 52 to the input/output data bus 53. Input data on the address and data bus 48 is passed internally through the processor 14 to the control logic unit 46 by the arithmetic logic unit 50. The arithmetic logic unit 50, in response to a control signal from the control logic unit 46 and in accordance with instructions received on the memory bus 20, performs arithmetic computations which may be stored in the temporary scratch registers 60. Other transfers of data between the arithmetic logic unit 50 and other logic elements the processor 14 are possible. Such additional transfers may be to the program counter 58, the data point register 56, and stack point register 54.

Also in the data stream for these various logic elements by means of the bus 48 is the status register 62. Operation of the processor 14 is determined by instructions of the memory bus 20 and input data on the input bus 13. For example, in response to received instructions the processor 14 may transfer data stored in a scratch register 60 to one of the registers 54, 56 or 62.

Such operation of processors as detailed in FIG. 2 are well known to those in the data and word processing field. Further, a more detailed description of the operation of the processor 14 is not necessary for complete understanding of the invention as claimed.

Figure 3:
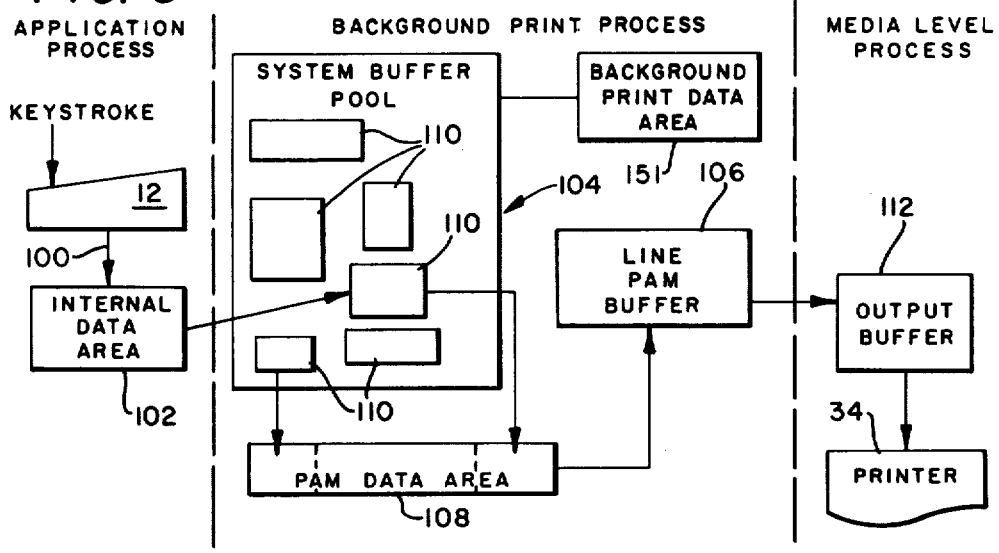
FIG. 3 is a block diagram of the interaction between the application process, background print process and media level process in the present invention.

Referring now to FIG. 3, the functional block diagram illustrates the relationship between the application process, background print process and media level process in the word processing system 10. In the application process, keystroke signals from the keyboard 12 are passed over signal path 100 to an internal data area 102. The application process defines the size of the system buffer pool 104 and allocates space for the buffer in memory 22. When the background print process gets control of the printer 34, it queries the printer 34 to determine the type of printer attached to the system 10. Based on the type of printer attached to the system 10, an optimal logical data length is selected for the printer access method (PAM) buffer 106 and stored in PAM data area 108.

The application process passes data from the internal data area 102 to an input program that builds a buffer header for the data and puts both the header and the data in the buffer pool 104. Each buffer 110 contains some amount of data as well as the header. The header defines where the next block is, where the first byte of the data is located, and how long the data is. The system buffer pool 104 will handle either single or multiple characters, as input from the keyboard 12 to the printer 34. The various sized blocks for the buffer 110 and the buffer pool 104 represent either single or multiple characters. The number of characters in the buffer pool 104 may be less than, the same or greater than the optimal logical data length of the PAM data area 108. The buffering scheme will put the optimum number of characters into the data area 108 when it is ready to fill it up. The optimally blocked data is then moved from the PAM data area 108 to the PAM line buffer 106.

Basically, there are four different types of commands: a graphic character (one byte), a print head movement command (one byte) (such as the space or backspace), microspace command (two bytes), and a change of keyboard command (multiple bytes) where one of the fields inside the command tells how long it is. The system buffer pool 104 is a circular buffer where each header points to where the next one is going to be. Everytime a buffer 110 is put into the buffer pool 104, a message is sent to the program which empties the pool 104. The emptying program transfers the reblocked data from the PAM data area 108 to the PAM buffer 106, reblocking the data based on the optimal number of logical commands for the printer being used (optimal logical data length). When the PAM buffer 106 contains the optimal number of logical commands, the printer access method (PAM) is activated to transfer the commands from the PAM buffer 106 to the output buffer 112. Commands are translated into printer commands and sent to the printer 34. There are some printers 34 available to the word processing system 10 which do not include an output buffer 112.

Figure 4:
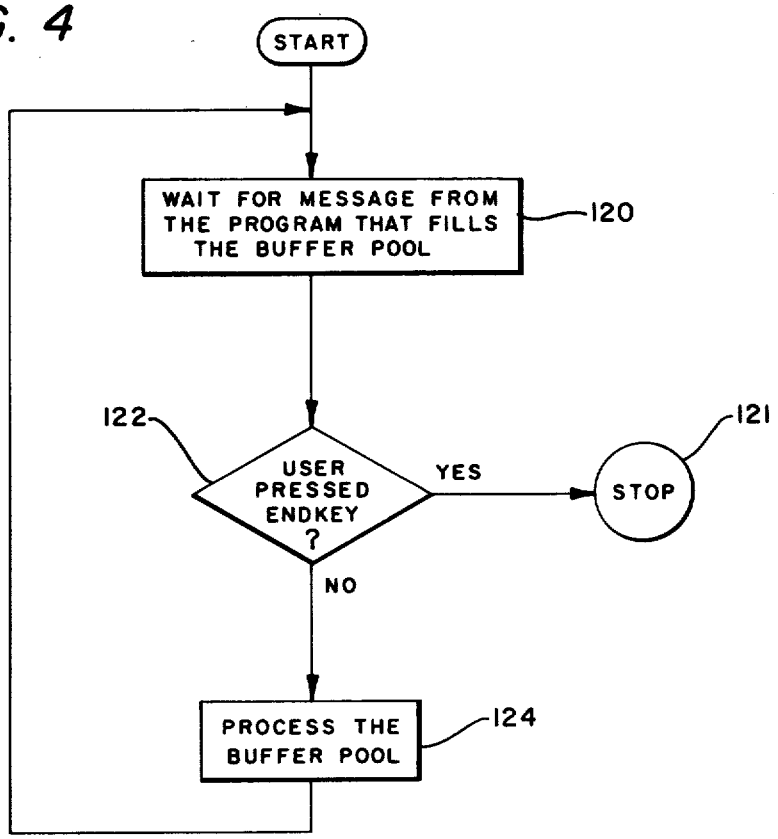
FIG. 4 is a flow chart of the buffering scheme of the present invention.

Referring now to FIG. 4, the flow chart is illustrated for the print buffering scheme of the present invention. The initial instruction 120 waits for a message from the input program that fills the buffer pool 104 (FIG. 2). The buffer scheme then advances to an inquiry 122 to determine if the user has pressed the END key. If the user has pressed the END key the print buffering scheme branches to stop instruction 121. If the user has not pressed the END key, the program advances to execute instruction 124 to process the buffer pool. Upon completion of processing the buffer pool, the program returns to instruction 120.

Figure 5:
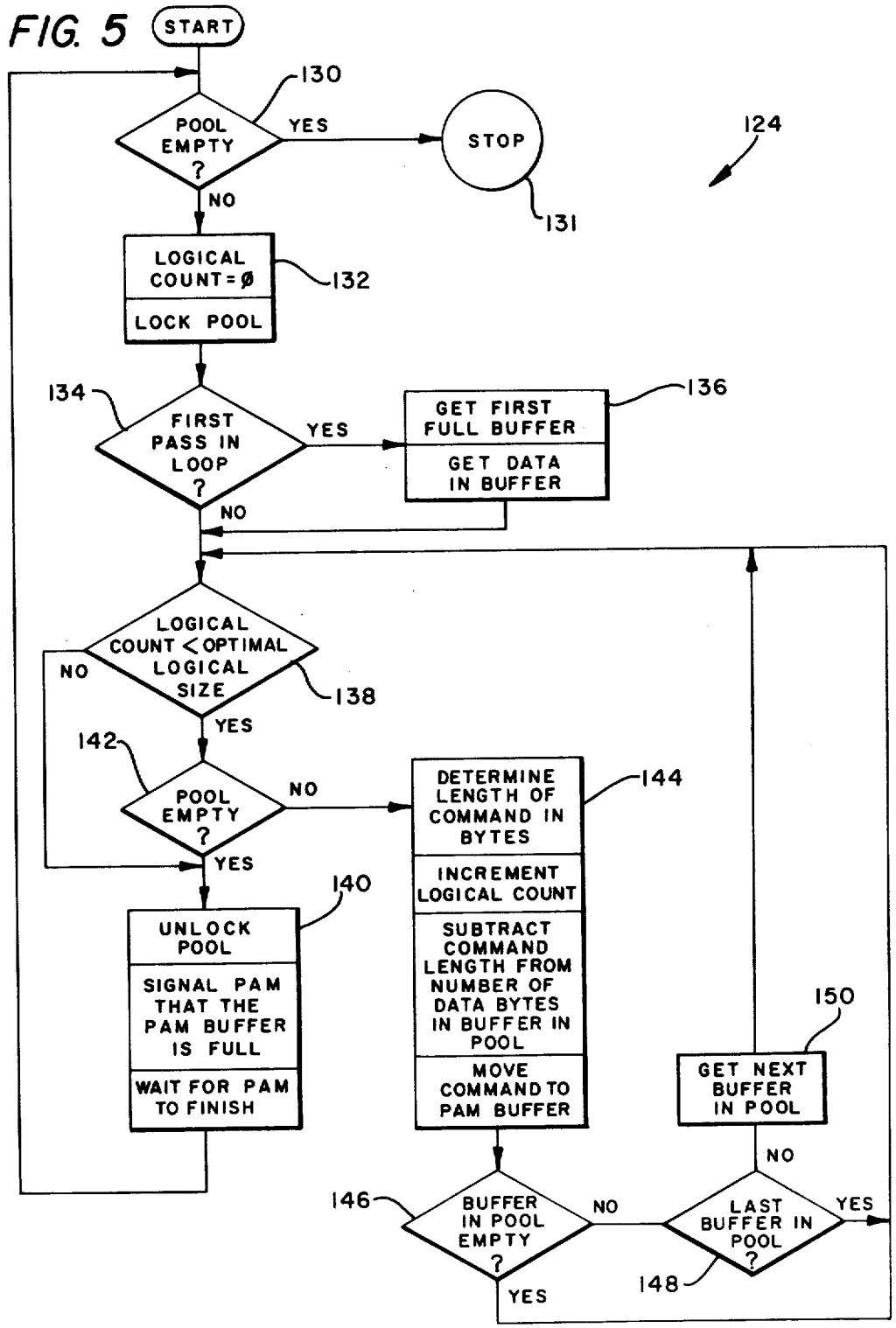
FIG. 5 is a flow chart of the processing of the buffer pool.

Referring now to FIG. 5, the routine initially enters an inquiry 130 to determine if the pool is empty. If the pool is empty, the routine branches out to an instruction 131 to stop the processing of the buffer pool. If the pool is not empty, the routine advances to instruction 132 to set the logical count to "0" and to unlock the buffer pool. The routine then enters an inquiry 134 to determine if it is in the first PAM loop. If it is the routine branches to instruction 136 to get the first full buffer and to get the data in the buffer. After processing instruction 136 or determining that it is not the first pass in the loop, the routine enters inquiry 138 to determine if the logical count is less than the optimal logical size for the printer. If it is not less than the optimal logical size, the routine branches to execute instruction 140 to unlock the pool, signal the printer access method that the printer access method buffer is full and wait for the printer access method to finish. Following execution of instruction 140, the routine branches back to inquiry 130. If the inquiry 138 determines that the logical count is less than the optimal size, the routine enters an inquiry 142 to determine if the buffer pool is empty. If it is empty, the routine advances to execute the instruction 140 as described above.

If the inquiry 142 determines that the buffer pool is not empty, the routine branches to execute instruction 144 to determine the length of the command in bytes, increment the logical count, subtract the command length from the number of data bytes in the buffer in the pool, and move the command to the PAM buffer. The routine then advances to inquiry 146 to determine if the buffer in the pool is empty. If it is not empty, the routine advances to the next inquiry 148 to determine if it is the last buffer in the pool. If it is not the last buffer in the pool, it enters the instruction 150 to get the next buffer in the pool, and then returns to inquiry 138. If inquiry 146 determines that the buffer in the pool is empty or that it is the last buffer in the pool as determined by inquiry 148, the routine again branches to the inquiry 138 as described hereinabove.

The pseudocode listings provided below are used in conjunction with operating systems produced by the IBM Corporation for its Displaywriter word processing system to carry out the present invention. The application and use of pseudocode is described in "An Introduction to Programming," (a structural approach using PL/1 and PL/C-7), Second Edition, by Richard Conway and David Gries, Wintrop Publishers, Cambridge, Mass., Copyright 1975.

Psuedocode Listing #1
Key to Print Main Background Print Control

```
APRECHO :
PROCEDURE .
OPEN PRINTER .
CALL CHECKERR .
IF (GOOD RETURN CODE) THEN
DO .
GET OPTIMAL LOGICAL DATA LENGTH FOR
PAM DATA AREA .
GET MANUAL VISIBILITY INDEX FLAG .
STORE BOTH VALUES IN PRINT
DATA CONTROL BLOCK .
POST THE FOREGROUND THAT BACKGROUND
PRINT IS READY TO RECEIVE DATA .
```

-continued
```
DO WHILE (THE END KEY HAS NOT BEEN PRESSED) .
IF ( POSTED FROM PRTDATA ) THEN
CALL BUFRMOVE .
IF (POSTED FROM FORMAT SET) THEN
DO .
CONTROL COM = ECHO .
/= RESET PRINT HEAD TO LEFT MARGIN =/
/ = RESET PRINT WHEEL ID =/
POST THE FOREGROUND THAT BACKGROUND
PRINT IS READY TO RECEIVE DATA .
END .
BGNWHILE .
WAIT ON THE FOREGROUND .
END .
IF (ONE LAST POST FROM PRTDATA) THEN
CALL BUFRMOVE .
CLOSE PRINTER .
CALL CHECKERR .
END .
RETURN .
CHECKERR:
PROCEDURE .
IF (BAD RETURN CODE) THEN
APREML .
END CHECKERR .
BUFRMOVE:
PROCEDURE .
EMPTY FLAG = OFF .
DO UNTIL (PDCB BUFFER POOL IS EMPTY) .
LOCK THE PDCB .
IF ( FIRST PASS ) THEN
GET FIRST BUFFER OF DATA .
DO WHILE ( (PAM DATA AREA DATA LENGTH IS
LESS THAN OPTIMAL LOGICAL DATA LENGTH)
AND (PDCB BUFFER POOL IS NOT EMPTY)
AND ( INPUT FITS INTO
THE PAM DATA AREA) ) .
DETERMINE THE LENGTH OF THE INPUT IN BYTES .
IF (COMMAND IS A LINE END CODE) THEN
LOGICAL DATA LENGTH = OPTIMAL LOGICAL
DATA LENGTH TO FORCE BUFFER END
DETERMINE THE LENGTH OF THE INPUT IN BYTES.
IF (THE INPUT FITS) THEN
MOVE INPUT INTO THE PAM DATA AREA .
ELSE
SET THE "WONT FIT" FLAG .
IF (INPUT BUFFER HAS BEEN PROCESSED) THEN
DO .
GET ANOTHER BUFFER .
CHECK FOR EMPTY PDCB BUFFER POOL .
END .
END .
UNLOCK THE PDCB .
DO WHILE (GOOD RETURN CODE) .
PRINTLINE .
CALL CHECKERR .
END .
IF (BAD RETURN CODE) THEN
DO .
LOCK THE PDCB .
FLUSH THE PDCB .
UNLOCK THE PDCB .
END .
END .
END BUFRMOVE .
END APRECHO .
```

Pseudocode Listing #2
Foreground Buffer Processor

```
APRBUFR :
PROCEDURE .
SET UP ADDRESSABILITY
TO THE FOREGROUND STACK .
LOAD MACRO PARAMETERS INTO REGISTERS .
./ = @ DATA - SEGMENT AND OFFSET =/
./ = DATA LENGTH =/
./ = @ PRINT DATA CONTROL BLOCK
(PDCB) - SEGMENT ONLY, OFFSET
= 0 =/
SET UP ADDRESSABILITY TO THE PDCB .
LOCK THE PRINT DATA CONTROL BLOCK .
IF (THE PDCB BUFFER POOL IS FULL) THEN
```

```
RREXIT.
LSE
O./ = BUFFER POOL HAS SOME SPACE IN
r =/
= BUFFER LENGTH = DATA
ENGTH + HEADER LENGTH
OMPUTE THE BUFFER LENGTH.
ET THE SPLIT UP DATA FLAG TO OFF.
= (FREE AREA IS IN THE MIDDLE
F THE BUFFER POOL ) THEN DO.
PACE AVAILABLE FOR NEW BUFFER = @
IRST FULL BUFFER - @ FIRST FREE SPACE.
= (SPACE AVAILABLE FOR NEW BUFFER < BUFFER
ENGTH ) THEN ERREXIT.
LSE
O./ = BUFFER POOL HAS ROOM FOR THE
EW BUFFER =/
= (SPACE AVAILABLE FOR NEW
UFFER <= BUFFER LENGTH +
EXT HEADER LENGTH) THEN
ET THE BUFFER POOL IS FULL FLAG ON.
OMPUTE THE OFFSET @ OF THE NEXT FREE SPACE.
ND DO./ = BUFFER POOL HAS ROOM FOR THE
EW BUFFER =/
ND DO./ = FREE AREA IS IN THE MIDDLE OF
HE BUFFER POOL =/
LSE
O./ = FREE AREA IS AT THE END(S) OF
HE BUFFER POOL =/
PACE AVAILABLE FOR NEW
UFFER = ( @ END OF THE BUFFER
OOL + 1) - @ FIRST FREE SPACE.
IORE SPACE = @ FIRST FULL BUFFER - 169
TART OF THE BUFFER POOL.
= (SPACE AVAILABLE FOR NEW
UFFER < BUFFER LENGTH ) THEN
O./ = TRY TO SPLIT THE BUFFER =
= (MORE SPACE <DATA LENGTH) THEN
RREXIT.
LSE
O./ = ENOUGH ROOM IN BUFFER POOL TO
PLIT BUFFER =/
= THE BUFFER WILL NOT
IT AT THE END OF THE =/
= BUFFER POOL SO SPLIT IT. THE HEADER AND AS =/
= MUCH DATA AS CAN FIT
/ILL GO AT THE END OF =/
= THE BUFFER POOL.
HE REST OF THE DATA WILL GO =/
= AT THE TOP OF THE BUFFER POOL WITHOUT A =/
= SECOND HEADER. =/
F (MORE SPACE < = (DATA
ENGTH + NEXT HEADER LENGTH ) ) THEN
ET THE BUFFER POOL IS FULL FLAG.
ET THE SPLIT UP DTA FLAG ON.
OMPUTE THE OFFSET @ OF THE NEXT FREE SPACE.
ND DO./ = ENOUGH ROOM IN BUFFER POOL TO
PLIT BUFFER =/
ND DO./ = TRY TO SPLIT THE BUFFER =/
LSE
O./ = BUFFER FITS AT THE END OF THE
OOL =/
F (SPACE AVAILABLE < (BUFFER
ENGTH + NEXT HEADER
ENGTH ) ) THEN
O.
F (MORE SPACE < = NEXT HEADER LENGTH) THEN
ET THE BUFFER POOL IS FULL FLAG "ON".
IFFSET @ OF THE NEXT FREE
PACE = START @ OF THE BUFFER POOL.
ND DO.
LSE
OMPUTE THE OFFSET @ OF THE NEXT FREE SPACE.
ND DO./ = BUFFER FITS AT THE END OF THE
OOL =/
ND DO./ = FREE AREA IS AT THE END(S) OF
HE BUFFER POOL =/
TORE @ NEXT FREE SPACE FOR
. BUFFER IN THE BUFFER HEADER.
F (THE SPLIT UP DATA FLAG IS ON) THEN
) FIRST DATA BYTE IN THE BUFFER  @
UFFER POOL START. ELSE
COMPUTE THE @ FIRST DATA BYTE IN THE BUFFER.
STORE THE @ FIRST DATA BYTE
IN THE BUFFER IN THE BUFFER HEADER.
STORE DATA LENGTH IN THE BUFFER HEADER.
SET ANY FLAGS IN THE BUFFER HEADER.
SET UP ADDRESSABILITY TO THE INPUT DATA.
SET UP REGISTERS FOR A STRING MOVE.
MOVE DATA INTO BUFFER.
STORE @ FIRST FREE SPACE IN THE PDCB.
UNLOCK THE PRINT DATA CONTROL BLOCK.
POST THE BACKGROUND LECB.
END DO./ = BUFFER POOL HAS SOME SPACE IN
IT =/
ERREXIT :
PROCEDURE.
UNLOCK THE PRINT DATA CONTROL BLOCK.
SET BAD RETURN CODE.
END ERREXIT.
END APRBUFR.
```

Although preferred embodiments of the invention have been illustrated in the accompanying Drawings and described in the foregoing Detailed Description, it will be understood that the invention is not limited to the preferred embodiments disclosed, but are capable of numerous rearrangements, modifications, and substitution of parts and elements without departing from the spirit of the invention.

What is claimed is:

1. A method for optimizing printer response time in a typing environment in a word processing system, including a keyboard, processor, display, memory and printer, in which the keyboard commands directly control the printer, comprising the steps of:

storing a logical data length representing a number of logical commands for the printer in a printer access method data area of said memory;

receiving a plurality of blocks of data entered via said keyboard, each of said data blocks including a variable number of logical commands;

creating a buffer header for each of said data blocks received from the keyboard;

transferring each buffer header and its associated data block to a buffer pool in said memory;

reblocking the data blocks in said buffer pool for the number of logical commands for said printer;

transferring said reblocked data blocks to a printer access method buffer in said memory;

evaluating whether said printer access method buffer contains the number of logical commands; and if said printer access method buffer contains the number of logical commands, transferring said reblocked data blocks from said printer access method buffer to the printer.

2. The method for optimizing printer response time of claim 1 and further comprising the steps of:

storing in memory the logical data length for multiple printers available for use in the word processing system;

determining the type of printer attached to the word processing system; and determining the number of logical commands for the type of printer attached to the word processing system from the logical data length for such a printer stored in said memory.

3. The method for optimizing printer response time of claim 1, wherein said reblocking step reblocks data blocks received in said buffer pool in first in first out (FIFO) order.

4. The method for optimizing printer response time of claim 1, wherein said step of transferring said reblocked data blocks from said printer access method buffer to the printer transfers said reblocked data blocks to an output buffer of the printer.

5. The method for optimizing printer response time of claim 1, further comprising the steps of:
   determining when each of said data blocks is transferred to said buffer pool; and
   generating a signal to transfer said reblocked data blocks to said printer access method buffer.

6. The method for optimizing printer response time of claim 1 further comprising the steps of:
   evaluating whether all blocks of data from the keyboard have been processed; and
   if all blocks of data have been processed, transferring said reblocked data blocks from said printer access method buffer to the printer.

7. A method for optimizing printer response time in a typing environment in a word processing system including a keyboard, processor, display, memory and one or more printers, where keyboard commands directly control the printers, comprising the steps of:
   storing in a printer access method data area of said memory, an optimal logical data length representing an optimal number of logical commands for each of the printers available for use in the word processing system;
   determining the type of printer attached to the word processing system;
   receiving a plurality of blocks of data entered via said keyboard;
   creating a buffer header for each block of data received from the keyboard;
   transferring each buffer header and its associated data block to a buffer pool in said memory;
   reblocking in first in first out (FIFO) order the data blocks in said buffer pool for the optimal number of logical commands for the type of printer attached to the word processing system;
   transferring said reblocked data blocks to a printer access method buffer in said memory;
   evaluating whether said printer access method buffer contains the optimal number of logical commands;
   evaluating whether all blocks of data from the keyboard have been processed; and
   if said printer access method buffer contains the optimal number of logical commands or if all blocks of data have been processed, transferring said reblocked data blocks from said printer access method buffer to the printer attached to the word processing system.

8. A method for optimizing printer response time in a typing environment in a word processing system including a keyboard, processor, display, memory and printer, where keystroke information directly controls the printer, comprising the steps of:
   storing a logical data length representing a number of logical commands that can be transferred to the printer during a key-to-print operation to provide real-time printing of keystroke information;
   receiving a plurality of blocks of data entered via said keyboard;
   creating a buffer header for each block of data received from a keyboard;
   reblocking the data blocks in a buffer pool for the number of logical commands;
   evaluating whether the reblocked data blocks contain the number of logical commands; and
   if the reblocked data blocks contain the number of logical commands, transferring said reblocked data blocks to the printer.

9. The method for optimizing printer response time of claim 8 further comprising the steps of:
   evaluating whether all blocks of data from the keyboard have been processed; and
   if all blocks of data have been processed, transferring said reblocked data blocks to the printer.

10. The method for optimizing printer response time of claim 8 wherein said data blocks are reblocked in first in first out (FIFO) order.

* * * * *